US007713017B2

(12) United States Patent
Stemmle

(10) Patent No.: US 7,713,017 B2
(45) Date of Patent: May 11, 2010

(54) METHOD AND DEVICE FOR UNLOADING STACKED MAILPIECES

(75) Inventor: Denis J. Stemmle, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1351 days.

(21) Appl. No.: 10/896,824

(22) Filed: Jul. 22, 2004

(65) Prior Publication Data
US 2006/0045726 A1 Mar. 2, 2006

(51) Int. Cl.
*B65H 31/30* (2006.01)
(52) U.S. Cl. .................. 414/789.9; 271/215; 198/468.6
(58) Field of Classification Search ............... 414/795.4, 414/789.9, 799, 782; 198/418.1, 468.6; 271/215, 271/3.03, 181, 178, 207
See application file for complete search history.

(56) References Cited

U.S. PATENT DOCUMENTS

2002/0189205 A1* 12/2002 Hart et al. .................... 53/447

* cited by examiner

*Primary Examiner*—Gregory W Adams
(74) *Attorney, Agent, or Firm*—Brian A. Collins; Angelo N. Chaclas

(57) ABSTRACT

A mail stack unloading device for use in a mail stacker to unload a stack of mail pieces in the mail stacker. The mail stacker has a pair of stack supports, located at a small angle from a vertical line, for supporting the mail stack as the mail pieces enter the mail stacker along a stacking path when the stack supports are in a stacking position. The stacker also has a platform or tongue connected to the stack supports such that the platform is positioned beneath the mail stack below the stacking path. During unloading, the platform is caused to move upward beyond the stacking path in order to engage with the stack, allowing the stack to be lifted. Then the stack supports are caused to forward beyond the vertical line in order to tip the lifted stack into a container.

13 Claims, 14 Drawing Sheets

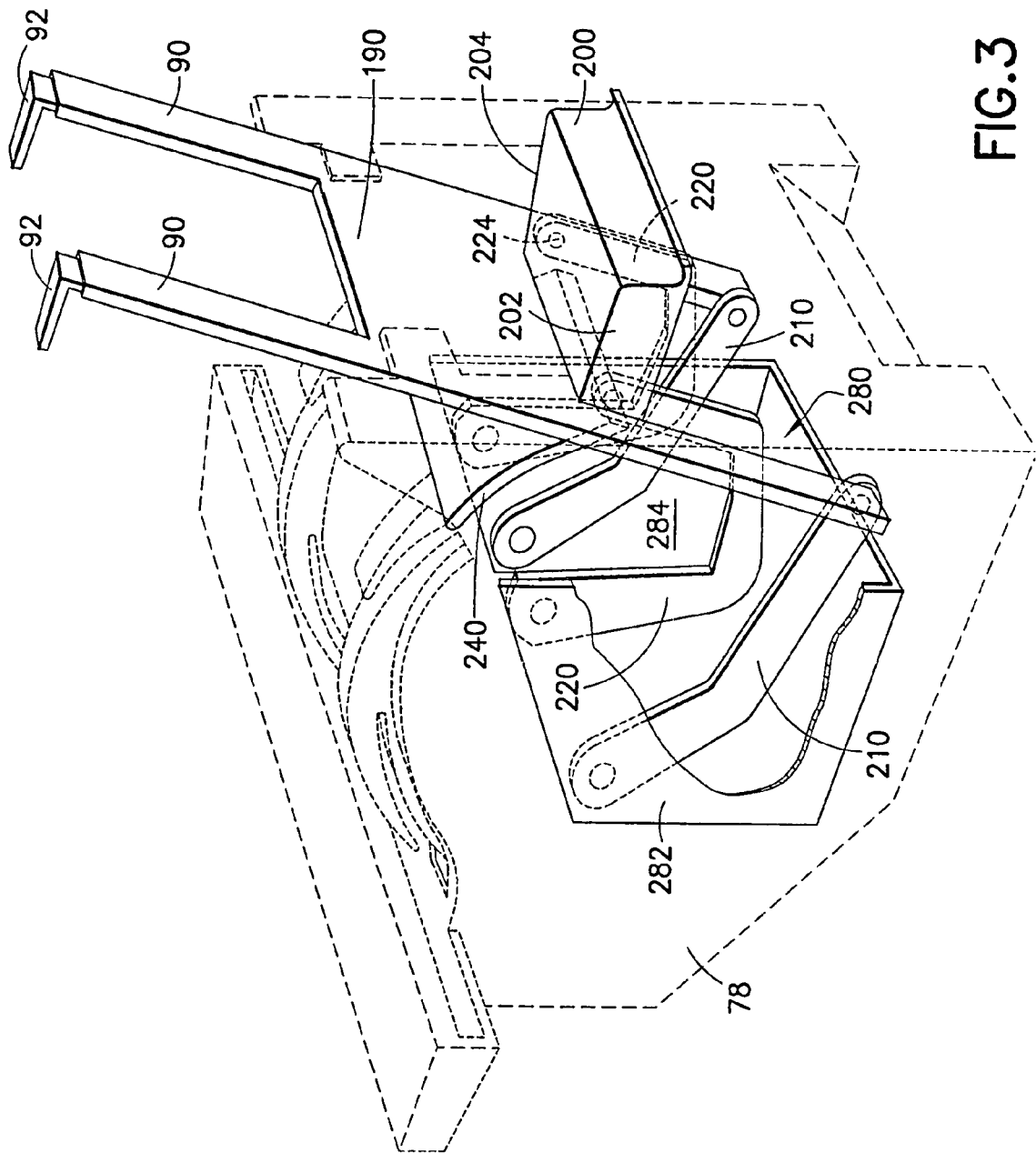

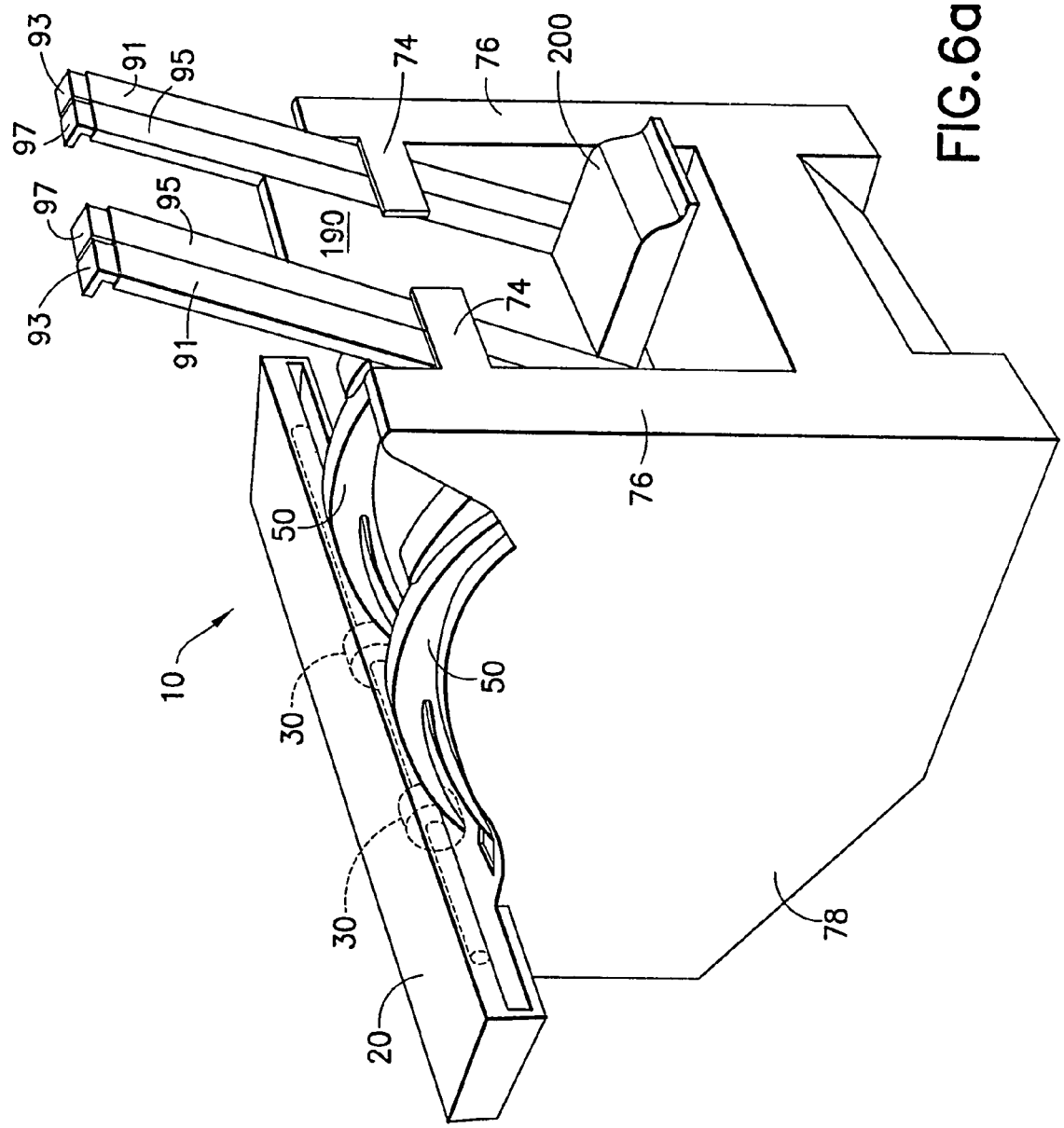

METHOD AND DEVICE FOR UNLOADING STACKED MAILPIECES

The present invention is related to patent application Ser. No. 10/896,394, assigned to the assignee of the present invention, filed even date herewith.

FIELD OF THE INVENTION

The present invention relates generally to a mail stacker and, more specifically, to the unloading of the stacked mail.

BACKGROUND OF THE INVENTION

A mail stacker is usually a part of a mailing machine, addressing equipment or mail creation equipment. Mail stackers can be classified into two types: top stackers and bottom stackers. In a top stacker, a later mail piece is stacked on top of the earlier ones. In a bottom stacker, a later mail piece is placed at the bottom part of the stack. In some applications such as addressing and inserting systems, mail pieces are required to be stacked in a certain serial order. For example, mail pieces are required to be stacked in a forward serial order in order to be eligible for a postal discount. The addressing information is typically printed on top of the mail pieces.

For mail pieces printed in a 1-to-N order, the topmost mail piece in a mail stack having a forward serial order is always printed earlier than the rest of the stack. However, top stackers will reverse the order of the mail pieces to an N-to-1 order while stacking. In order to keep a forward serial order when using a top stacker, an application software can be used to reverse the serial order when addressing. The use of order-reversing software adds considerable complexity to the mail processing system, especially for jam recovery.

Thus, in a mail system requiring a forward serial order, it is advantageous and desirable to use a bottom stacker to reverse the serial order while stacking.

Bottom stackers are known in the art. For example, Keane et al. (U.S. Pat. No. 6,398,204 B1) discloses a belt stacker wherein mail pieces are separately fed by an edge feeder to a stacking deck on the edge of the stacker at the upstream end of the stacking deck. The mail pieces already in the stack are moved by a conveyer belt toward the downstream, away from the edge feeder. At the same time, a stack support is used to keep the stacked mail pieces in an upright position while they are moved downstream. The stack support must be moved toward the downstream end to allow additional room for the stack to grow. In Keane et al., the stack support is either manually relocated or moved by the conveyor belt. Marsullo et al. (U.S. Pat. No. 5,709,525) also discloses a bottom stacker, wherein a pusher mechanism is used for sealing the incoming envelope and pushing the sealed envelope onto a horizontal deck for stacking. In order to keep the stacked envelope in an upright position, a stack support is placed on top of the stack. The stack support is urged by a spring disposed on the back side of the stack support against a rear wall of the stacking deck.

This type of bottom stacker requires a large footprint in that the size of the stacker is determined mainly by the size of the stack, and not the size of the mail pieces in the stack.

It should be noted that during normal operation of a bottom stacker, an operator may unload small portions of the stack from the top of the stack as mail continues to be added to the bottom of the stack. This is typically done one handful of stacked mail at a time. One handful may be a portion of the stack between one and five inches high. Stacker unloading may constitute the operator removing small segments of a larger stack from the top of the stack multiple times and placing each small segment of the stack in a storage container. Typically, the stacker can continue to operate while this unloading operation is underway.

For high speed stacking systems, the option of unloading the small portions from the top of the stack may require continual operator attention. Alternately, the operator can choose to wait until a larger stack has accumulated in the stacker and unload larger and heavier stacks from the stacker less frequently. If the operator chooses to unload the stacker less frequently, but in larger batches, it will save the operator substantial amount of time, thus freeing the operator to attend to other tasks while the system continues to operate. However, if the stacker unloading operation requires that the operator shut down the stacking system while unloading it, then both the operator and the system will be less efficient. It will be desirable to unload large stacks without having to shut down the system.

It is, however, commonly known by mail equipment operators that picking up and handling large stacks of mail pieces is often an awkward and unwieldy process, requiring a high degree of operator skill and experience. Large vertical stacks of mail pieces often have an undesirable aspect ratio of height to cross sectional area, and the stack tends to be quite unstable when it is not supported on an edge. This stack instability occurs when an operator attempts to pick up and handle a large, unsupported segment of a vertical stack of mail. When an inexperienced operator attempts to pick up a larger stack of mail, it is quite common for the stack to collapse, or portions of the stack to fall away from other portions of the stack, and thus the mail pieces are no longer in the correct order. The operator must take time to restore the stack back into the correct order. Because of the frequency of such stack collapse problems, mail workers find it desirable to handle mail in trays. For the USPS, a typical mail tray will handle a stack of mail that is approximately 24 inches long. It is thus advantageous and desirable to provide a method and device to assist unloading of stacked mail without the risk of collapsing the stack during the unloading operation. It is further advantageous to unload up to approximately 24" stacks of mail directly into a standard mail handling container such as the mail trays used by the USPS as part of their standard mail handling processes.

SUMMARY OF THE INVENTION

The present invention provides a mail stack unloading device for use in a mail stacker to unload a stack of mailpieces in the mail stacker. The unloading device comprises:

a pair of stack supports for supporting the mail stack as the mailpieces enter the mail stacker along a stacking path when the stack supports are in a stacking position and for carrying the mail stack to an unloading position;

a platform connected to the stack supports, wherein when the stack supports are in the stacking position, the platform is positioned beneath the mail stack below the stacking path; and a linkage structure associated with the stack support to cause the platform to move upward beyond the stacking path in order to engage with the stack, allowing the stack to be lifted, and to cause the stack supports to move from the stacking position to the unloading position, thereby tipping the stack into a container for unloading.

According to the present invention, the linkage structure comprises:
- a first linkage pivotally connected to the stack supports at a first pivot point and pivotally connected to the stacker at a second pivot point; and
- a second linkage pivotally connected to the stack supports at a first pivot point and pivotally connected to the stacker at a second pivot point; and wherein
- the distance between the first and second pivot points of the first linkage is smaller than the distance between the first and second pivot points of the second linkage, and
- the second pivot point of the first linkage is located closer to the stack than the second pivot point of the second linkage to the stack, so that moving of the stack supports from the stacking position causes the platform to move upward beyond the stacking path in order to engage with the stack for lifting the stack in a mostly translational direction relative to the stacker and subsequently in a mostly rotational direction relative to the stacker as the stack supports moves from the stacking position to the unloading position.

The present invention will become apparent upon reading the description taken in conjunction with FIGS. 1 to 6b.

BRIEF DESCRIPTION OF THE DRAWINGS

FIG. 3 is a cut-out view showing the mechanical linkage of the stack supports it their home positions.

FIG. 6a is a perspective view showing another embodiment of the present invention.

DETAILED DESCRIPTION OF THE INVENTION

Figure 1A:
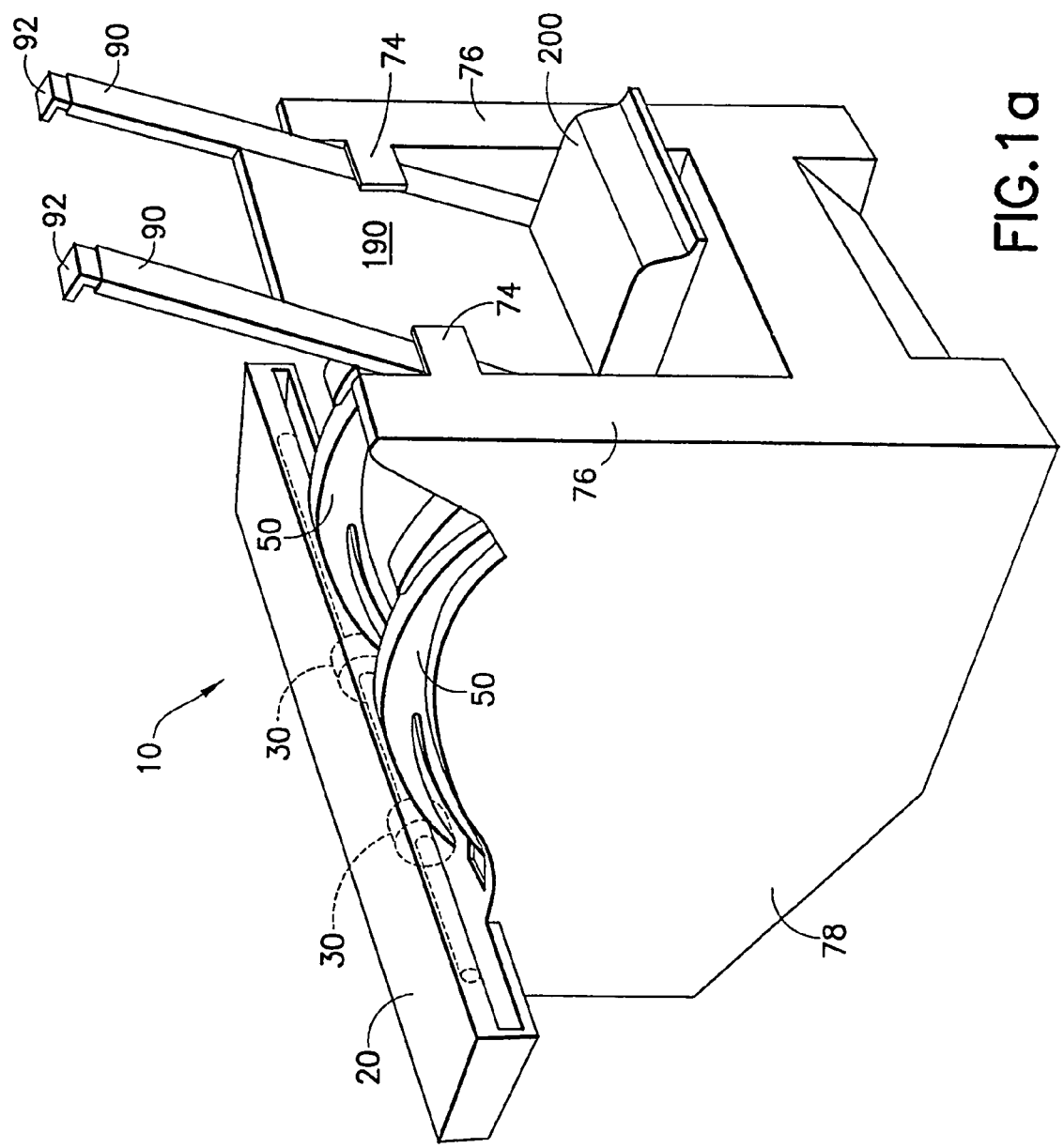
FIG. 1a is a perspective view showing the mail stacker, according to the present invention.
Figure 1B:
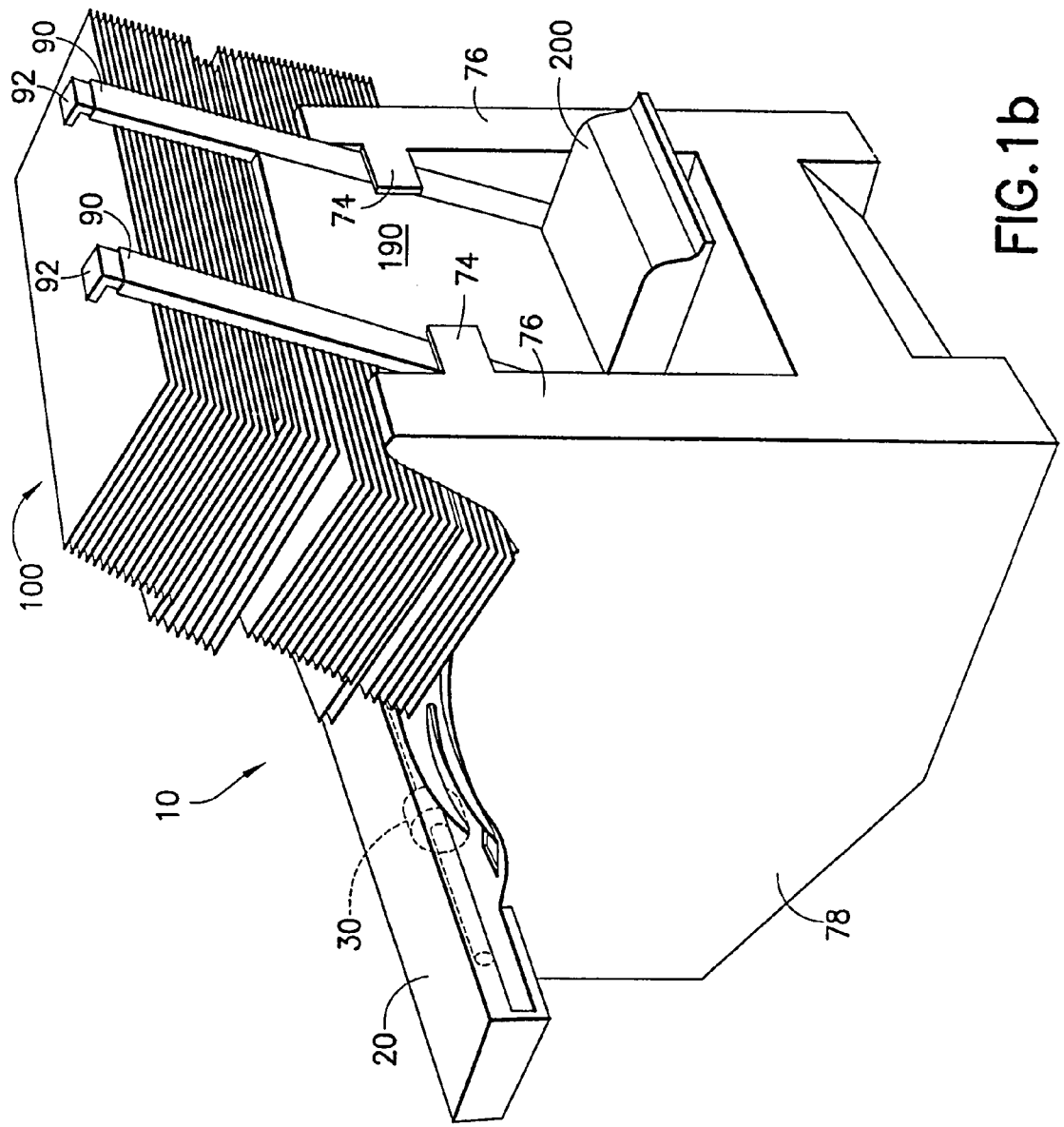
FIG. 1b is a perspective view showing the mail stacker with a stack of mail pieces accumulated thereon.
Figure 2:
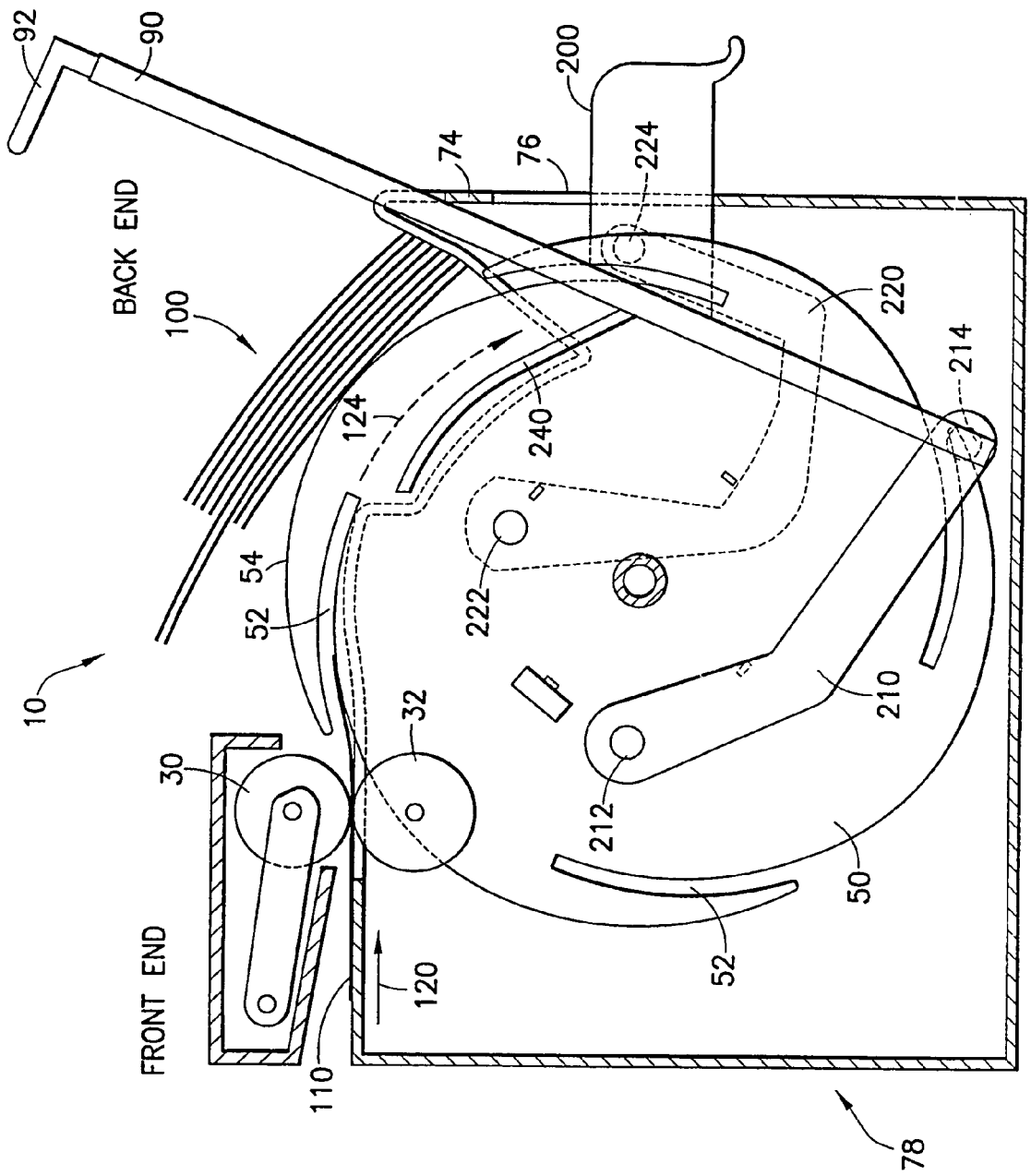
FIG. 2 is a schematic representation showing how the stack supports of the mail stacker are mounted.

The bottom stacker, according to the present invention, uses a plurality of slotted disks to accept incoming mail pieces. As shown in FIGS. 1a to 2, the bottom stacker 10 receives incoming mail pieces through an input guide 20, which has a plurality of rollers 30, 32 to move the mail pieces 110, one at a time, toward a pair of slotted disks 50. The slotted disks rotate intermittently in order to take the incoming mail pieces, one at a time, to the back end of the stacker 10, along a moving path 124. The mail piece that is brought to the back end by a slot 52 will be pushed upward by the arm 54 of the following slot 52 so that the mail piece is added to the bottom of the existing stack 100. The accumulated mail pieces in the stack 100 are urged by the gravitational force against a pair of stack supports 90, which are placed in the back section 76 of a stacker frame 78. Each of the stack supports 90 may have a telescoping lower section and an extendable upper section 92 to accommodate a larger stack. Alternately, the stack support 90 could be a rigid structure large enough to support a stack of the desired height. During the stacking operation, the stack supports 90 are in their home position, resting on a pair of back stops 74 extended from the frame section 76. The stack supports 90 are linked together by a plate 190. A lift mechanism 200 is fixedly mounted on the plate 190 for lifting and tilting the stack supports 90 in order to unload the stack 100.

As shown in FIGS. 2 and 3, the lift mechanism 200 and the stack supports 90 are movably mounted on a support frame 280 by two pairs of linkage bars 210 and 220. The support frame 280 is fixedly mounted to the stacker frame 78. As shown in FIGS. 2 and 3, the support frame 280 has a first side wall 282 and a second side wall 284 for movably mounting the linkage bars 210 and 220 separately at pivot points 212 and 222. The lift mechanism 200 has a first side plate 202 and a second side plate 204 for movably mounting the linkage bars 220 at pivot points 224 on the side plates 202, 204. The linkage bars 210 are also pivotably mounted on the lower end of a stack supports 90 at pivot points 214.

As shown in FIG. 2, the stack supports 90 are also fixedly connected to a tongue or platform 240, which is positioned below the moving path 124 of a mail piece 110 to be stacked when the stack supports 90 are in their home position. Thus, during the stacking operation, the tongue 240 is positioned below the bottom of the stack 100, as shown in FIG. 2. In the unloading process, the tongue 240 is used to lift the mail stack 100 upward, away from the upper periphery of the slotted disks 50. The position of the tongue 240 during the unloading process is shown in FIG. 4c. Because the pivot point 222 is positioned separately and above the pivot point 212, the stack supports 90 are initially caused to move upward when the lift mechanism 200 is pulled upward by an operator. Thus, the tongue 240 is efficiently moved upward to lift the mail stack 100 before the mail stack 100 is substantially tilted. However, because the distance between the upper pivots 222 and 224 is smaller than the distance between the lower pivots 212 and 214, the mail stack 100 is efficiently tilted forward as the lift mechanism 200 is further pulled upward. In other words, the relative length of the linkage bars and their positions render the movement of the stack supports 90 more of a translation initially but more of a rotation at the later stage.

Figure 4A:
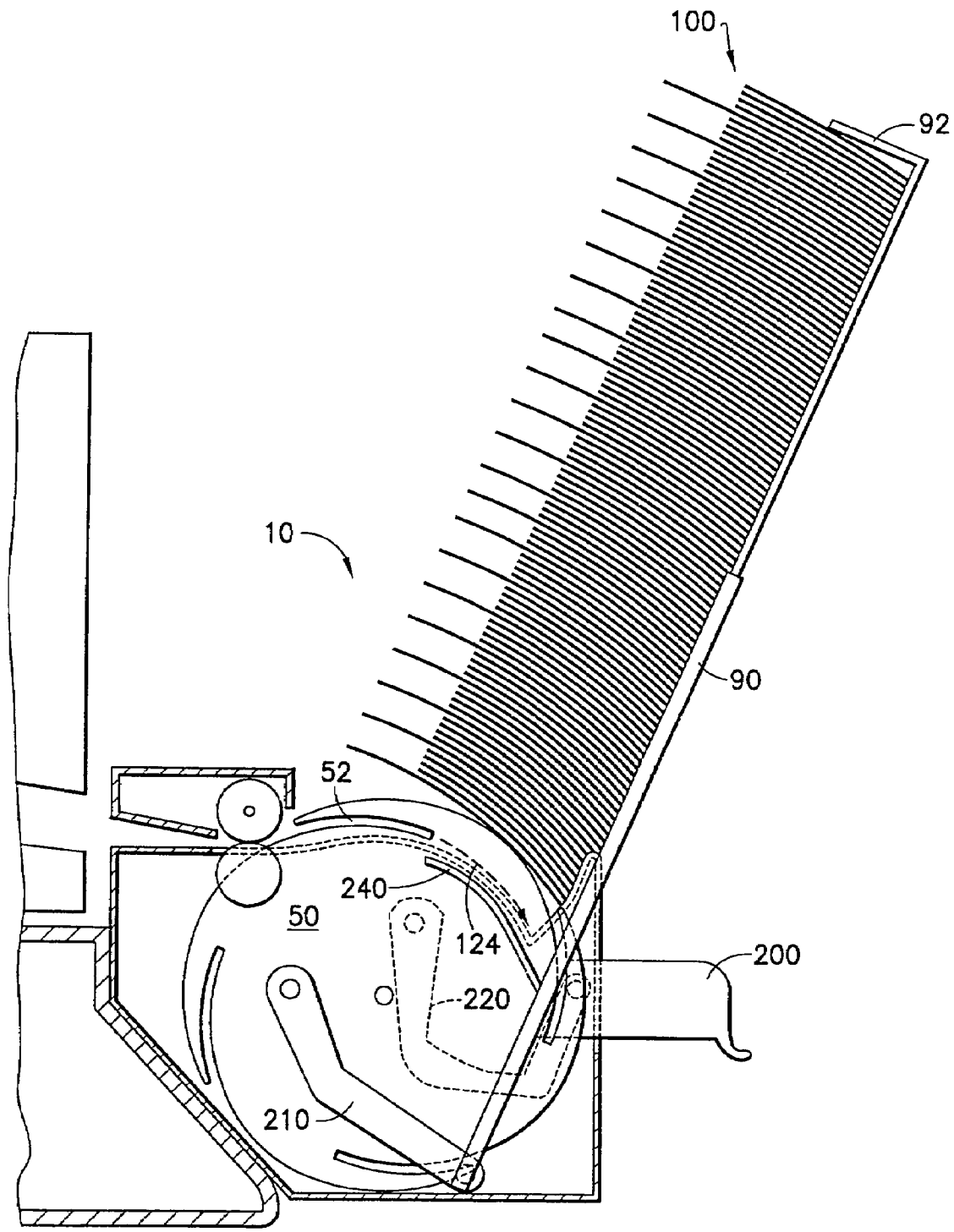
FIG. 4a is a schematic representation showing the unloading mechanism and the mail stack in the stacker when these stack supports are in their home positions.
Figure 4B:
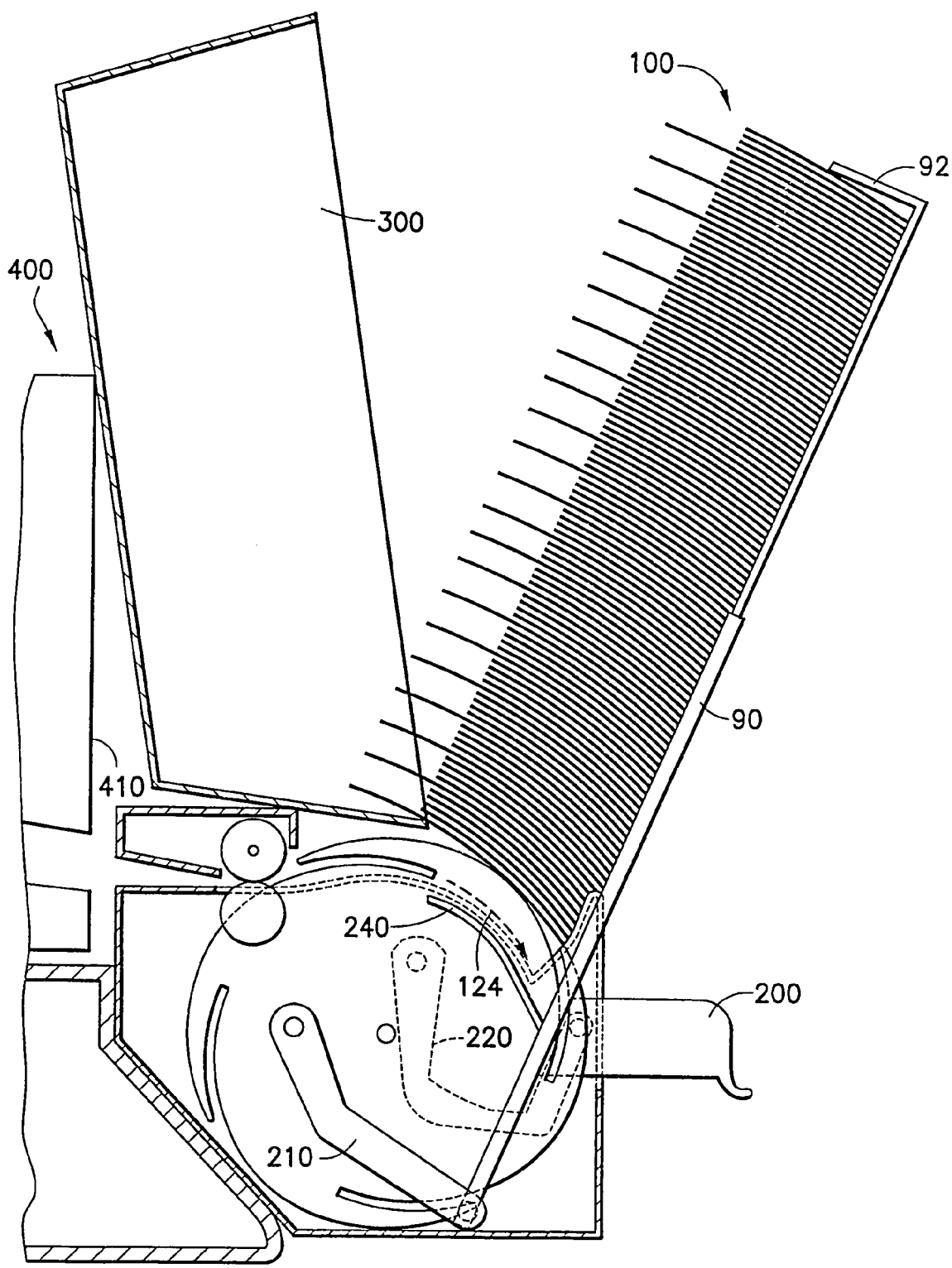
FIG. 4b is a schematic representation showing a mail tray positioned in relation to the mail stack.
Figure 4C:
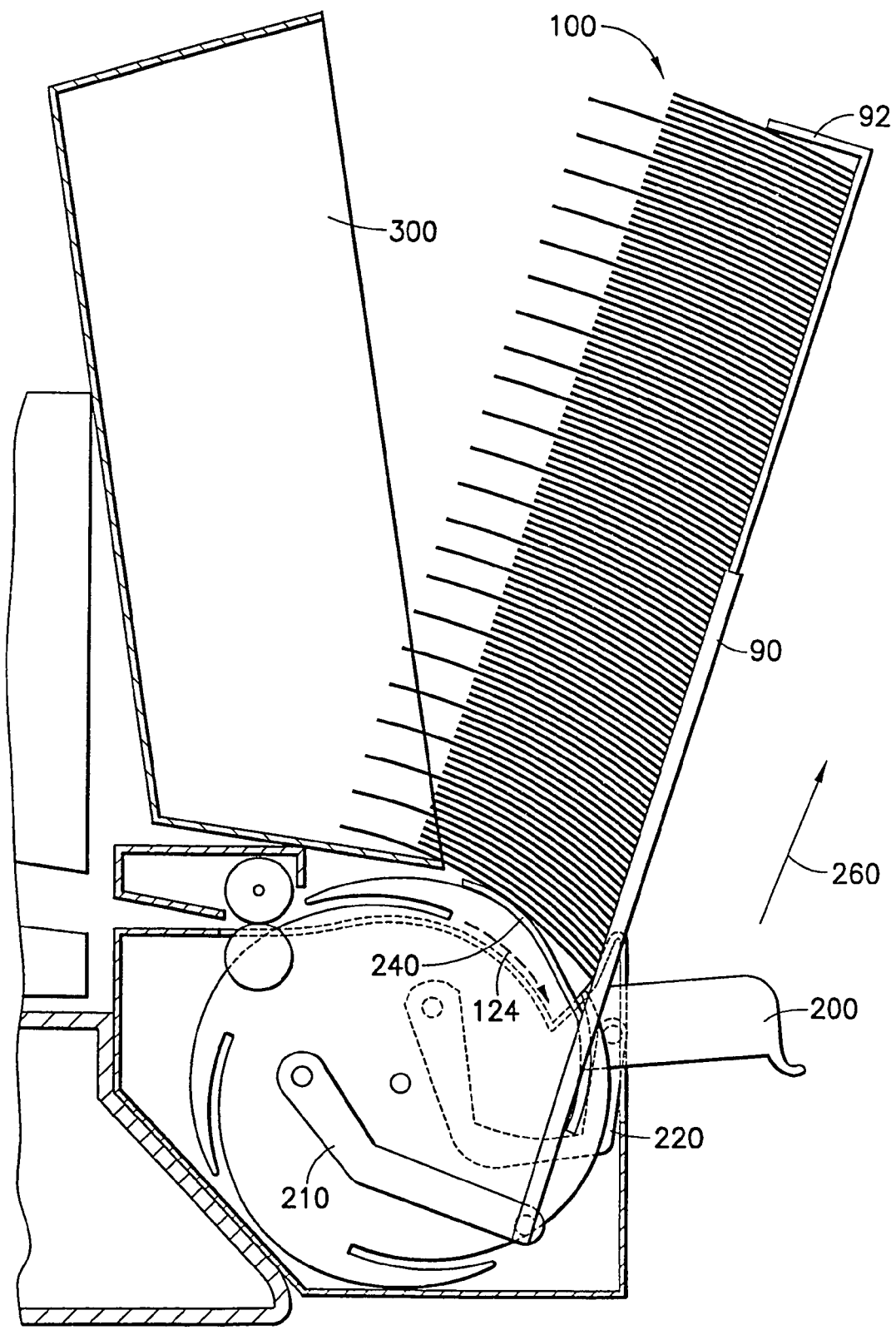
FIG. 4c is a schematic representation showing the step of lifting the mail stack from its initial position.
Figure 4D:
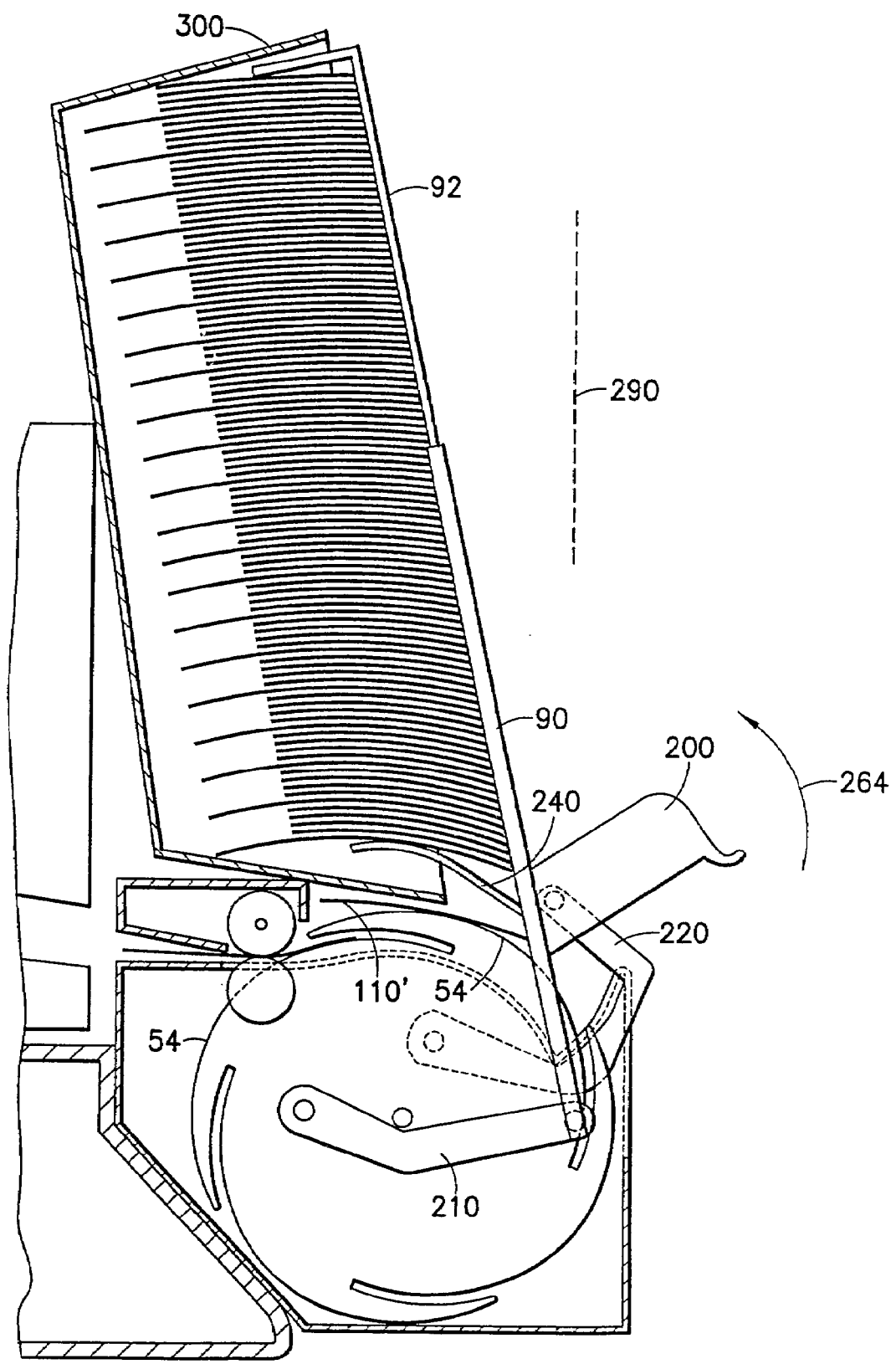
FIG. 4d is schematic representation showing the step of tilting the mail stack toward the mail tray.
Figure 4E:
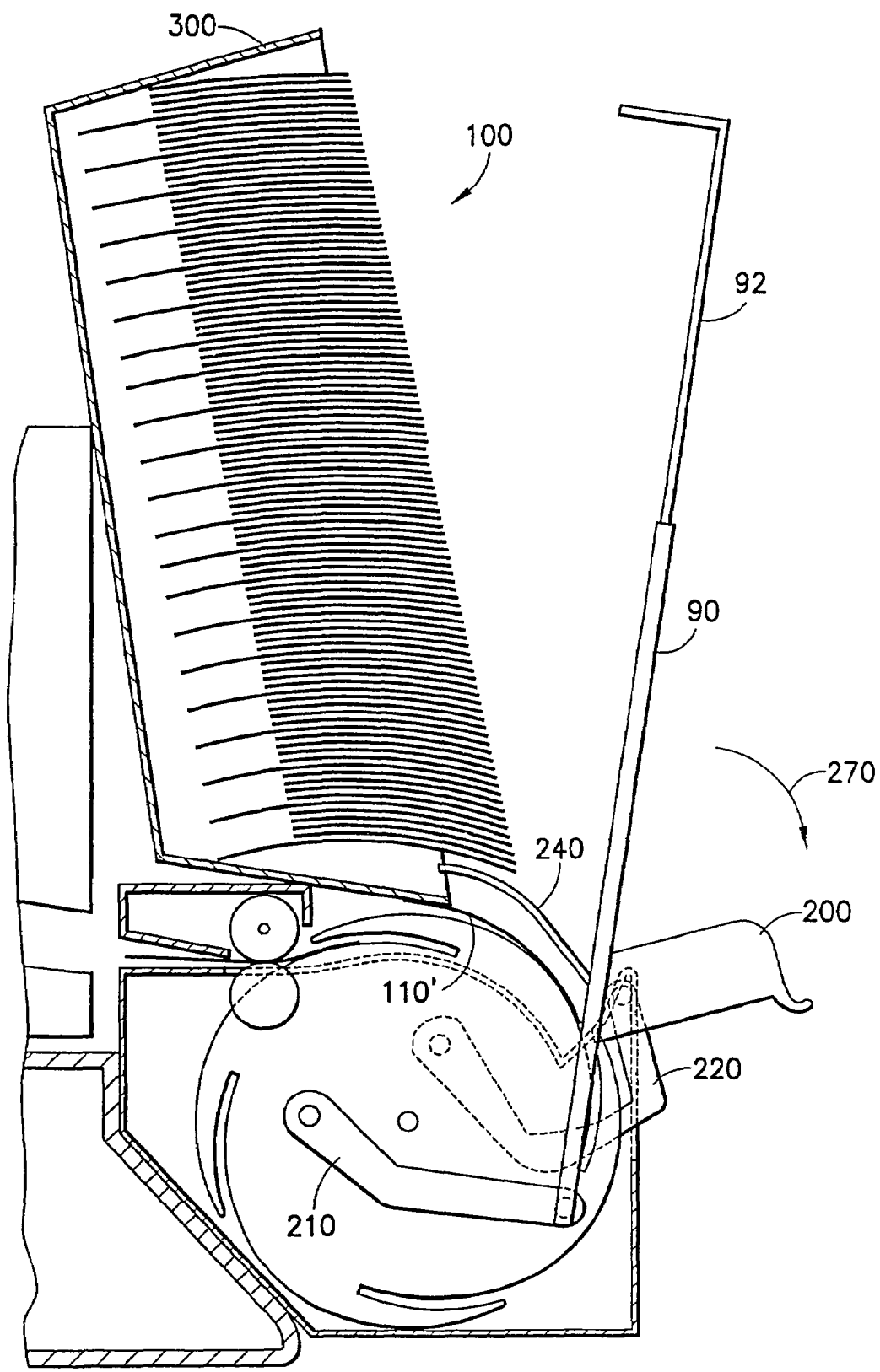
FIG. 4e is schematic representation showing the step of disengaging the mail stack from the stack supports.

FIGS. 4a to 4g are side views of the stacker illustrating the mail stack unloading process. FIG. 4a shows the stack supports 90 are slightly tilted backward as they are in their home position during the stacking process. As shown, the stack 100 is oriented in a near vertical position in order to reduce the stacker footprint and to take advantage of the gravitational force on stacking. As shown, the tongue 240 is located below the moving path 124 of the mail piece to be stacked. As such, the tongue 240 does not interfere with the stacking process when a mail piece 110 is carried into the bottom of the stack 100 by a slot 52 (see FIG. 2). When the operator wants to unload the stack 100, the operator places a mail tray 300 facing the stack 100. As shown in FIG. 4b, the tray 300 is placed on the front portion of the stacker, leaning against a support 410, which may be a structure dedicated to supporting the tray, or may be a feature such as a cover of a mailing system 400. Subsequently, the operator pulls the lift mechanism 200 upward, as indicated by the arrow 260 shown in FIG. 4c. This causes the tongue 240 to move upward along with the stack supports 90. After the tongue 240 reaches the bottom of the stack, it is used to move the stack 100 upward. When the lift mechanism 200 is pulled further upward, the tongue 240 is positioned above the moving path 124 and also the arms 54 of the slotted disk. As such, it is possible to carry out the stacking process, allowing new mail pieces 110' to be stacked while the operator unloads the existing stack 100, as shown in FIG. 4d. As the lift mechanism 200 is further pulled upward, the movement of the stack supports 90 is now more of a rotation, as indicated by the arrow 264. After the stack supports 90 is moved forward to a certain angle in relation to the vertical line 290, the stack is no longer supported by stack supports 90. The rotation of the stack supports tips the stack of mail into tray 300. At this stage, the mail stack 100 is substantially engaged with the tray 300 and stays in the tray 300.

After the mail stack 100 is loaded into the tray 300, the stack supports 90 are caused to move away from the tray 300 as the lift mechanism 200 is allowed to move downward. The stack supports move away in a substantially rotational movement as indicated by the arrow 270 shown in FIG. 4e. Subsequently, the stack supports 90 are allowed to move back to their home position.

Figure 4F:
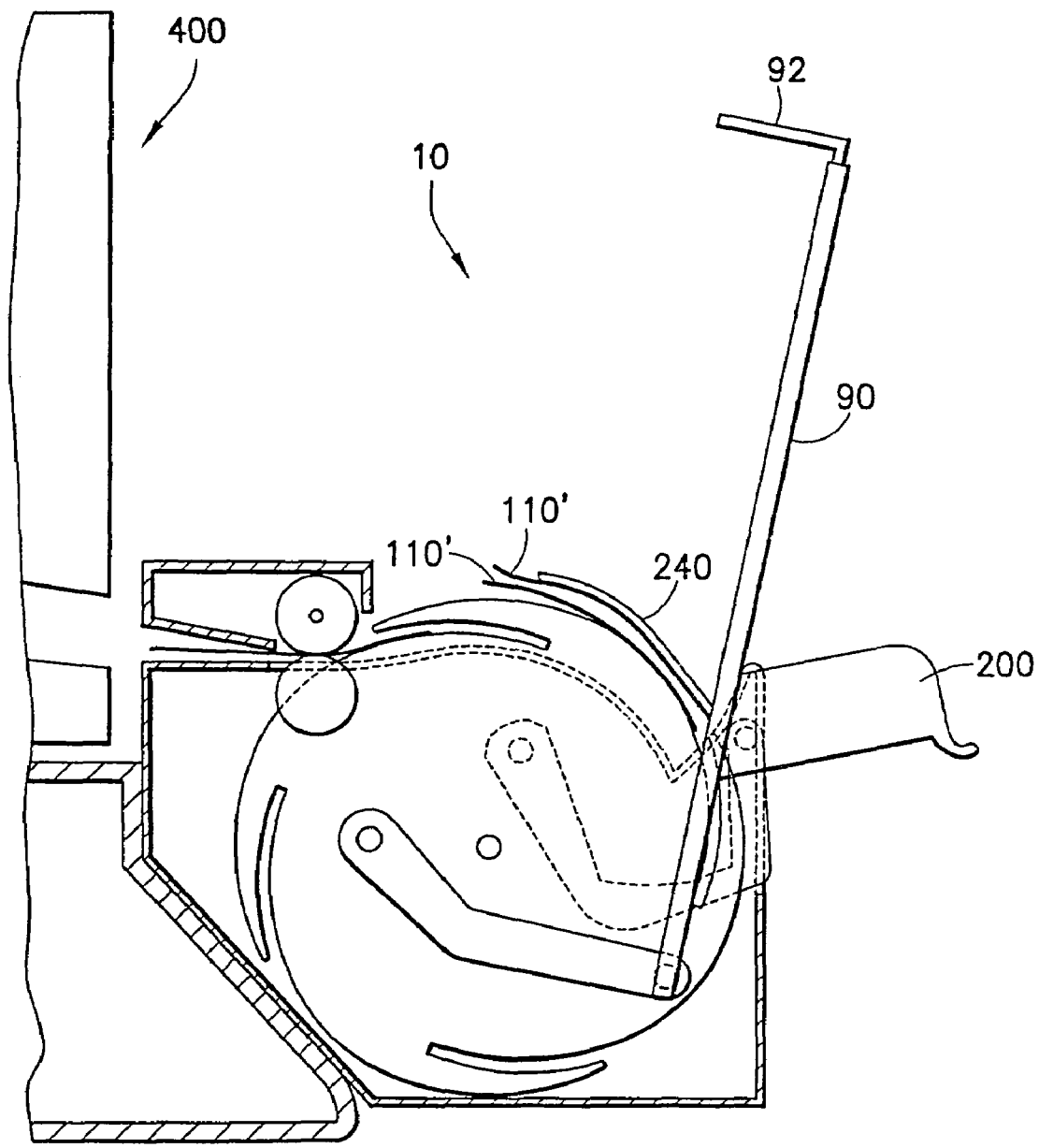
FIG. 4f is a schematic representation showing the step of lowering the stack supports toward their home position.
Figure 4G:
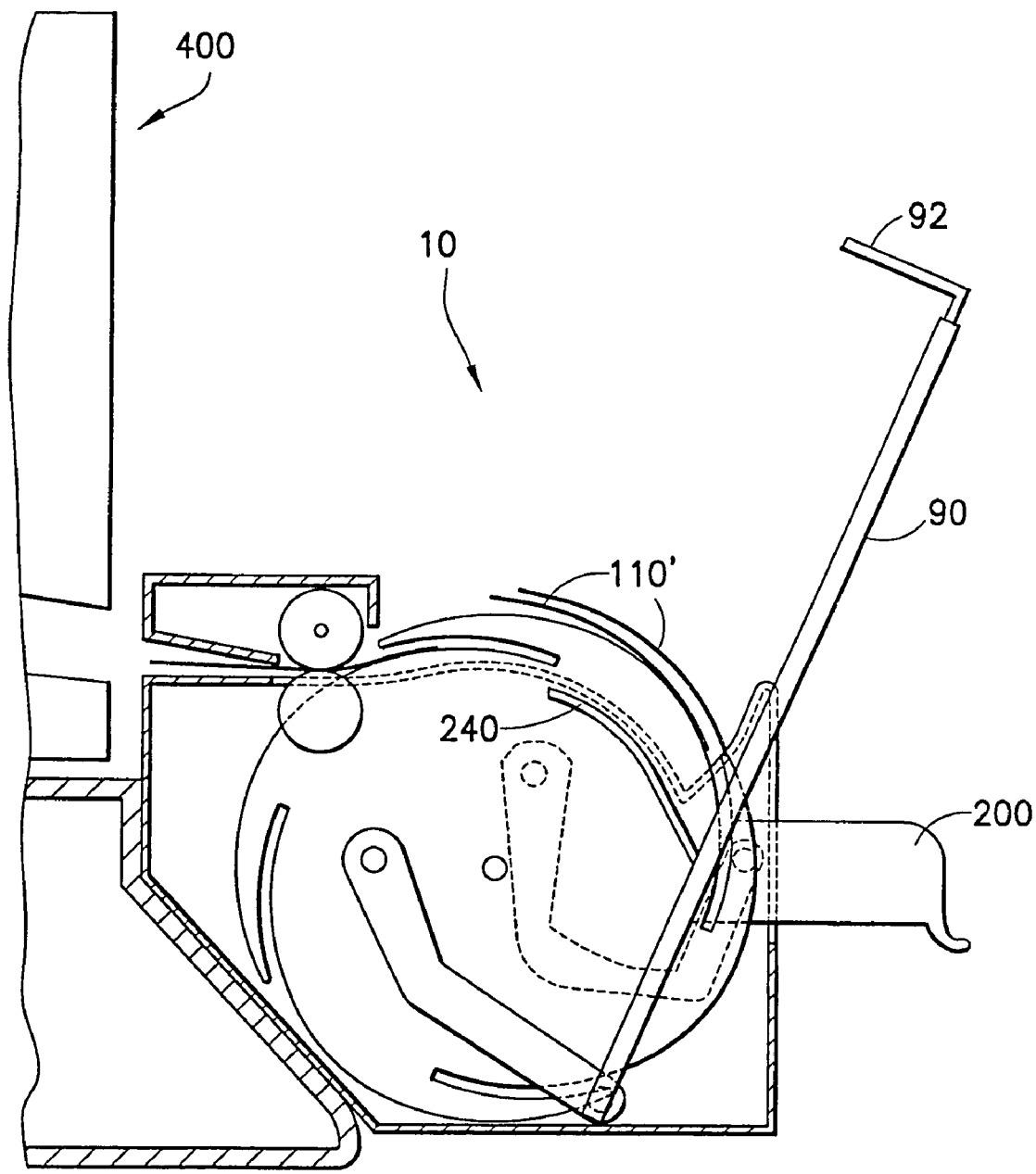
FIG. 4g is a schematic representation showing the stack supports in their home position.
Figure 5:
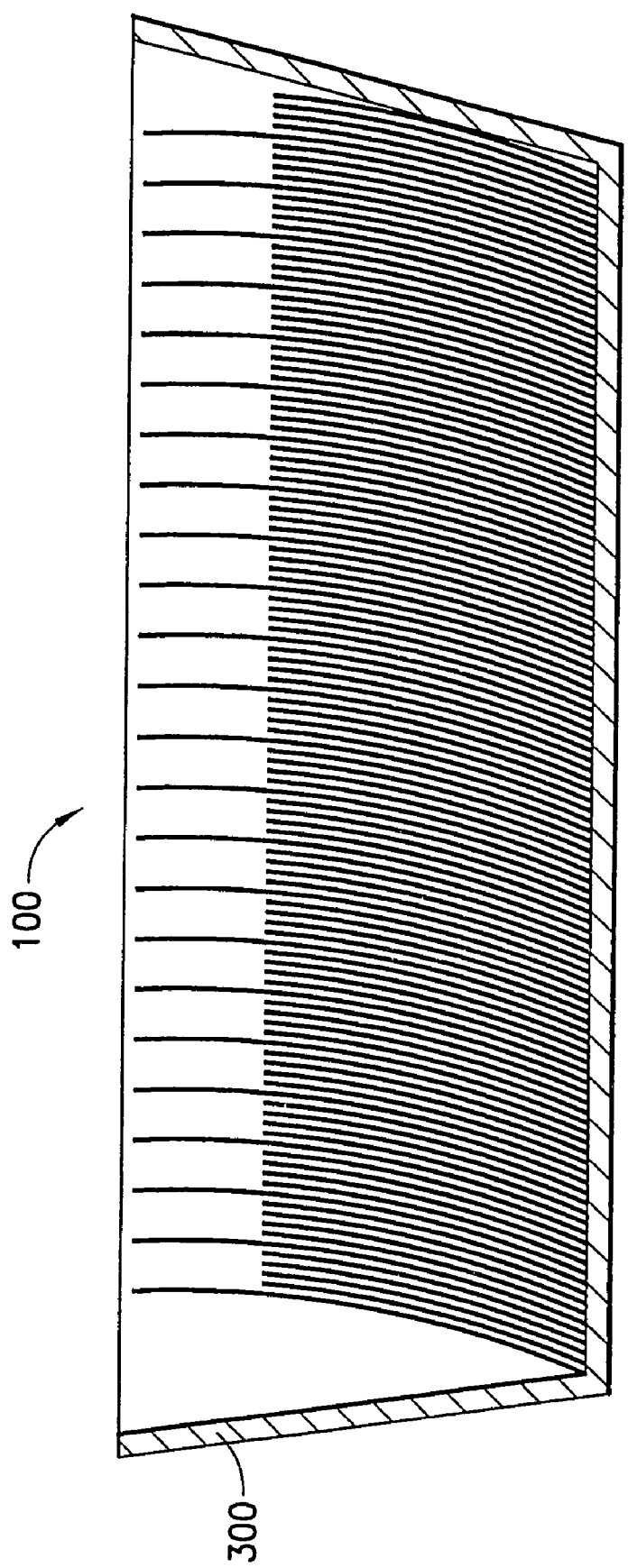
FIG. 5 is a schematic representation showing a loaded mail tray that has been taken off from the stacker.

It should be noted that, however, if the stacking process is carried out during unloading, one or more mail pieces 110' may have accumulated in the back section of the stacker, against the stack supports 90. In that case, the tongue 240 will settle on top of the newly accumulated mail pieces 110', as shown in FIG. 4f. The operator must remove the accumulated mail pieces 110' from below the tongue 240 and allow the tongue 240 and the stack supports 90 to return to their respective home positions, as shown in FIG. 4g. Afterward, the operator can place those new mail pieces 110' above the tongue 240. The tray 300 that is loaded with a stack of mail pieces 100 can be taken off the wall 410 and located elsewhere, as shown in FIG. 5. The tray 300 can be a container of a predetermined size and shape, such as a standard container used for processing mail in sorting and distribution centers.

Figure 6B:
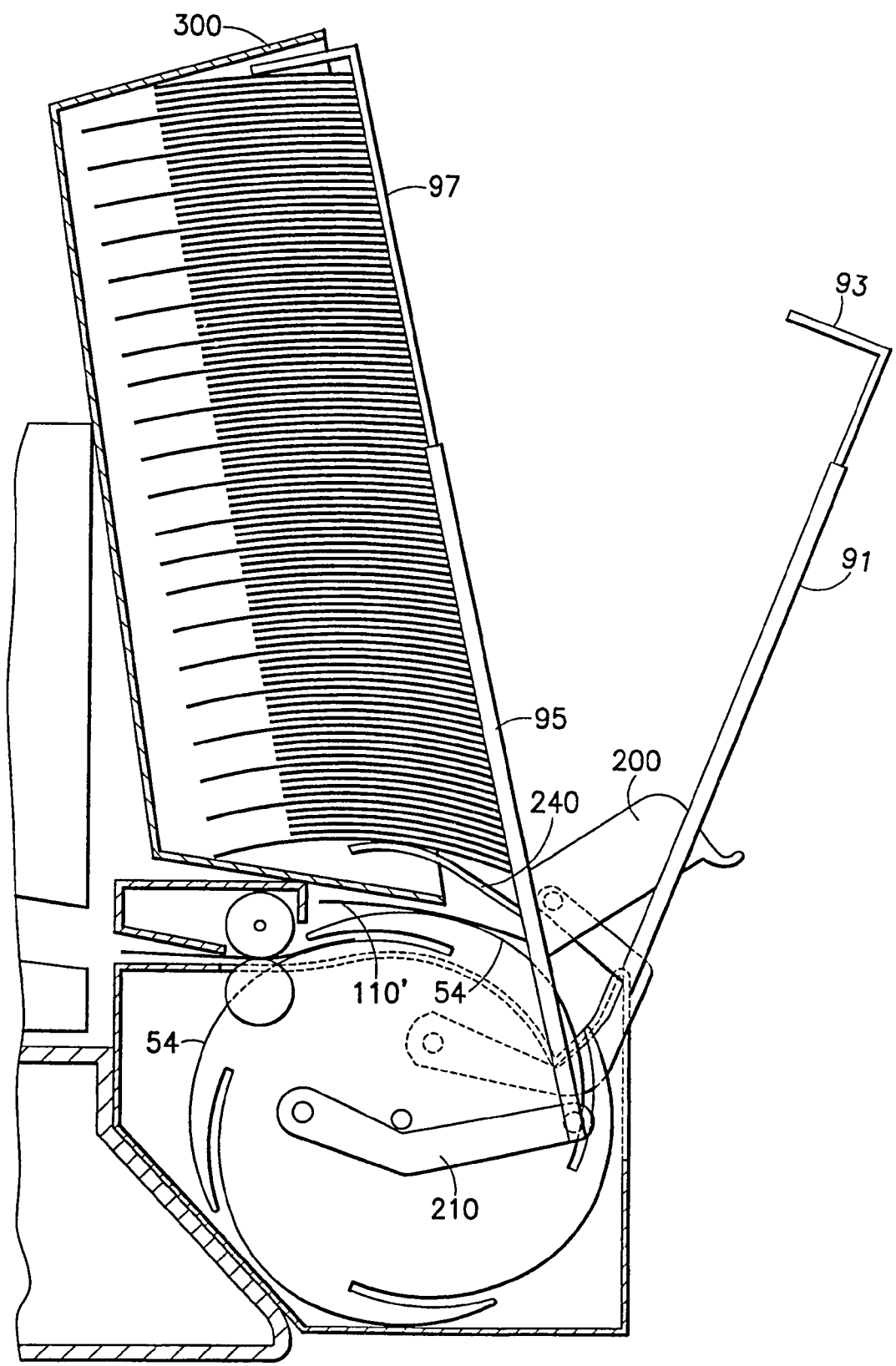
FIG. 6b is a schematic representation showing the step of tilting the mail stack and disengaging the mail stack from the stack supports.

It will be appreciated to those skilled in the art that the unload assist device described herein could also be deployed in a system in which the stack support function is separate from the unload operation described above. As shown in FIGS. 6a and 6b, a separate stack support structure consisting of a pair of stack supports 91 remains in a fixed position while the unload assist mechanism (95, 97, 190, 200) lifts the stack up and away from this fixed stack support structure and tips the stack into the tray as described above. As shown in FIG. 6b, the extendable section 93 of each stack support 91 returns to its home position after the stack has been moved away.

It should be noted that the stacker 10 with the unload assist mechanism, according to the present invention, is most useful when the stacker is linked up with other components of a mailing machine or system 400, as shown in FIGS. 4a to 4g. The mailing system can be a mail inserter, for example, wherein documents are inserted into envelopes for mailing. The mail system 400 may have a printer for addressing the inserted envelopes.

It should also be noted that the stacker 10 with the unload assist mechanism can be beneficially used to improve the unloading function for any number of stackable items other than mail pieces. Examples might include license plates, printed material, CD disk cartridges and the like.

Although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A stack unloading device for use in a stacker to unload stacked items, the stacker comprising means for moving the stacked items along a stacking path, said device comprising:
   means for supporting the stacked items, said supporting means movable between a stacking position and an unloading position;
   a platform connected to the supporting means so as to be positioned beneath the stack below the stacking path when the supporting means is in the stacking position; and
   a linkage structure associated with the supporting means to move the platform upward beyond the stacking path in order to engage with the stack, to lift the stack, and to move the supporting means from the stacking position to the unloading position, thereby tipping the stack into a container for unloading.

2. The stack unloading device of claim 1, wherein said linkage structure comprises:
   a first linkage pivotally connected to the supporting means at a first pivot point and pivotally connected to the stacker at a second pivot point; and
   a second linkage pivotally connected to the supporting means at a first pivot point and pivotally connected to the stacker at a second pivot point; and wherein
   the distance between the first and second pivot points of the first linkage is smaller than the distance between the first and second pivot points of the second linkage, and
   the second pivot point of the first linkage is located closer to the stack than the second pivot point of the second linkage to the stack, so that moving of the supporting means from the stacking position causes the platform to move upward beyond the stacking path in order to engage with the stack for lifting the stack in a mostly translational direction relative to the stacker and subsequently in a mostly rotational direction relative to the stacker as the supporting means moves from the stacking position to the unloading position.

3. The stack unloading device of claim 1, wherein
   the stacker has a first end and an opposing second end,
   the moving means moves the stacked hems along the stacking-path from the first end toward the second end, and
   the supporting means has an upper portion and a lower portion, wherein
   the upper portion is located at the second end when the supporting means is in the stacking position, allowing the stacked items to rest on the upper portion of the supporting means, and wherein
   the upper portion is caused to move toward the first end of the stacker when the supporting means is moved to the unloading position, causing the stacked items to move away from the upper portion of the supporting means toward the first end of the stacker.

4. The stack unloading device of claim 1, wherein the supporting means comprises:
   one or more support members to allow the stacked items to rest thereon when the supporting means is in the stacking position, and
   a handle connected to the support members for lifting and tilting the support members when the supporting means is moved from the stacking position to the unloading position.

5. The stack unloading device of claim 2, wherein the supporting means comprises:
- one or more support members, each having a lower portion and an upper portion to allow the stacked items to rest thereon when the supporting means is in the stacking position, and
- a handle connected to the support members, wherein the first linkage and the second linkage are pivotally connected at the first pivot points at the lower portion of the support members, and at the second pivot points on the handle.

6. The stack unloading device of claim 5, wherein the platform is fixedly connected to the support members.

7. The stack unloading device of claim 5, wherein the upper portion of each of the support members is extendable, if necessary, so as to support the upper portion of the stack when the stack grows beyond a specified height.

8. The stack unloading device of claim 1, wherein the stacked items are mail pieces.

9. The stack unloading device according to claim 8, wherein the container is a container of a predetermined size and shape for processing mail in sorting and distribution centers.

10. The stack unloading device of claim 1, wherein the supporting means comprises:
- one or more supporting members to allow the stacked items to rest thereon when the supporting means is in the stacking position, and
- one or more further supporting members to allow the stacked items to rest thereon when the supporting means is moved away from the stacking position.

11. The stack unloading device of claim 10, further comprising
- a handle connected to the further supporting members for lifting and tilting the further supporting members when the supporting means is moved from the stacking position to the unloading position.

12. The stack unloading device of claim 10, wherein said linkage structure comprises:
- a first linkage pivotally connected to further supporting members at a first pivot point and pivotally connected to the stacker at a second pivot point; and
- a second linkage pivotally connected to further supporting members at a first pivot point and pivotally connected to the stacker at a second pivot point; and wherein
- the distance between the first and second pivot points of the first linkage is smaller than the distance between the first and second pivot points of the second linkage, and
- the second pivot point of the first linkage is located closer to the stack than the second pivot point of the second linkage to the stack, so that moving of the supporting means from the stacking position causes the platform to move upward beyond the stacking path in order to engage with the stack for lifting the stack in a mostly translational direction relative to the stacker and subsequently in a mostly rotational direction relative to the stacker as the supporting means moves from the stacking position to the unloading position.

13. The stack unloading device of claim 11, wherein
the stacker has a first end and an opposing second end,
the moving means moves the stacked items along the stacking path from the first end toward the second end, and
the further support members have an upper portion and a lower portion, wherein
the upper portion is located at the second end when the supporting means is in the stacking position, and wherein
the upper portion is caused to move toward the first end of the stacker when the supporting means is moved toward the unloading position, causing the stacked items to rest on the upper portion of the further supporting members and then to separate from the further supporting members when the supporting means substantially reaches the unloading position.

* * * * *